United States Patent [19]

Frizot

[11] Patent Number: 5,184,805
[45] Date of Patent: Feb. 9, 1993

[54] DEVICE FOR THE OPTIMUM POSITIONING OF AN EXTENSION PIECE ON A THREADED CONNECTION ELEMENT

[75] Inventor: Alain Frizot, Mont Cenis, France

[73] Assignee: Framatome, Courbevoie, France

[21] Appl. No.: 775,762

[22] Filed: Oct. 15, 1991

[30] Foreign Application Priority Data

Oct. 16, 1990 [FR] France ............................ 90 12754

[51] Int. Cl.$^5$ .............................................. E21B 19/00
[52] U.S. Cl. .................................................. 254/29 A
[58] Field of Search ................... 254/29 A; 81/57.38; 29/452

[56] References Cited

U.S. PATENT DOCUMENTS 3,679,173  7/1972  Sherrick et al.
3,844,533  10/1974  Markiewicz et al. ............ 254/29 A
4,485,677  12/1984  Amelot et al. .................... 254/29 A
4,708,036  11/1987  Vossbrinck ....................... 254/29 A Primary Examiner—Robert C. Watson
Attorney, Agent, or Firm—Pollock, Vande Sande & Priddy

[57] ABSTRACT

A device for optimum positioning of at least one extension piece (10) on at least one threaded connection element (1) for fastening a component to an appliance, each extension piece being screwed onto one connection piece, and the device comprising a module for supporting and tensioning the threaded connection elements (1) by means of the extension pieces (10). The module is centered on the threaded connection elements (1) and supported relative to the component, and the extension pieces are slid in a horizontal plane relative to the axis of the threaded connection element (1).

12 Claims, 5 Drawing Sheets

DEVICE FOR THE OPTIMUM POSITIONING OF AN EXTENSION PIECE ON A THREADED CONNECTION ELEMENT

FIELD OF THE INVENTION

The present invention relates to a device for the optimum positioning of an extension piece on each such element of a set of threaded connection elements intended for fastening a component to an appliance.

BACKGROUND OF THE INVENTION

In many industrial uses, a plurality of threaded connection elements such as bolts are employed for fastening a component removably to an appliance.

This applies particularly to pressurized vessels used in industry, especially the nuclear industry, for example the vessels of nuclear reactors, or the chemical or petrochemical industry, where a cover is fastened removably to a vessel so that work can be carried out periodically in the vessel.

For this purpose, the cover is fastened to the vessel by means of bolts which are screwed into internally-threaded holes provided in the upper part of the vessel and which penetrate into open-ended bores provided in the flange of the cover and corresponding to the internally threaded holes.

These bolts are generally used in somewhat large numbers and relatively close to one another, and a pull is usually exerted on each bolt by means of a tension devices, for the purpose of keeping it in a prestressed device state, and while this pull is being exerted a clamping nut is screwed or unscrewed.

In some cases, the bolts are of the short type, and therefore to exert on these bolts the pull necessary to keep them in a prestressed state at the moment of screwing or unscrewing of the clamping nut, it is essential to screw an extension piece onto the free end of each bolt.

Each extension piece is screwed onto a connection element by means of a supporting module which bears on the component to be fastened and which for this purpose comprises means for driving the extension piece in rotation, in order to screw it onto or unscrew it from the connection element, and means for tensioning the threaded connection element.

This supporting and extending module consists of a one-piece assembly which makes it possible generally to position two extension pieces and to tension two connection elements simultaneously by means of these extension pieces.

However, this system constitutes a rigid assembly which is difficult to manipulate and position in order to align each extension piece with the corresponding threaded connection element, and therefore the screwing of the extension pieces very often causes flanging which can prevent screwing or cause a seizure, because of the error of alignment attributable to the fact that the module is positioned askew on the component to be fastened.

In the past, the alignment has been obtained by adjusting the a position of each extension piece manually, but this is far from satisfactory where repetitive operations are carried out, for example, in an irradiated environment.

SUMMARY OF THE INVENTION

The object of the present invention is to overcome these disadvantages and provide a device which makes it possible to position the extension pieces automatically on corresponding threaded connection elements in order to carry out the screwing of these extension pieces under the best possible conditions.

The subject of the invention is a device for optimum positioning of at least one extension piece on at least one threaded connection element for fastening a component to an appliance, the or each extension piece being screwed onto one threaded connection element, and the device comprising a module for supporting the extension piece or pieces and comprising means for driving the extension piece or extension pieces in rotation for screwing onto or unscrewing from the corresponding threaded connection element, and means for tensioning the threaded connection element or elements by means of the corresponding extension piece. the device:

means for centering module on the threaded connection element or elements, means for supporting the module relative to the component, and means for sliding the extension piece or pieces in a horizontal plane in relative to the axis of the corresponding threaded connection element at the time of screwing of the extension piece or extension pieces.

According to other characteristics of the invention:

the centering means are formed by two bushes mounted on each side of the module by means of fastening member, and each of the bushes interacting with the free end of the threaded connection element adjacent to the threaded connection element or elements receiving the said extension piece, the members for fastening each bush to the module are formed by a first part fixed to the module and by a second part fixed to the corresponding bush, these parts being displaceable relative to one another in a vertical plane and in a horizontal plane, the means for sliding the extension piece or pieces in a horizontal plane in relation to the axis of the corresponding threaded connection element are interposed between the first part fixed to the module and the second part fixed to the corresponding bush of each fastening member, the first part of each fastening member comprises a vertical axle connected to the module by means of a bracket and having a male cone in its lower part, the vertical axle is provided at its lower end with a bolster mounted slidably in the axle and forming with the lower face of the latter a space in which the means for sustaining the said module are mounted, the means for supporting the module consist of at least one elastic member, the elastic member is formed by a stack of spring washers, the second part of each fastening member comprises a female cone interacting with the male cone of the first part and formed in a cover having a central orifice for the passage of the vertical axle of the first part, the cover being mounted on the upper end of a housing fastened to the corresponding bush, the female cone provides with the corresponding male cone a play when the bush bears on the component to be fastened, this play being adjustable by means of shims interposed between the cover and the housing, the means for sliding the extension piece or pieces in a horizontal plane consist of at least two ball cartridges arranged between the bottom of the housing and the bolster of the first part of the corresponding fastening member, the ball of each ball cartridge bearing on the lower face of the bolster at the moment of screwing of the extension piece or pieces, the lower face of the said bolster is provided with an interchangeable wearing plate.

BRIEF DESCRIPTION OF THE DRAWINGS

The invention will be better understood from the following description given by way of example and with reference to the accompanying drawings, in which.

DESCRIPTION OF PREFERRED EMBODIMENT

Figure 1:
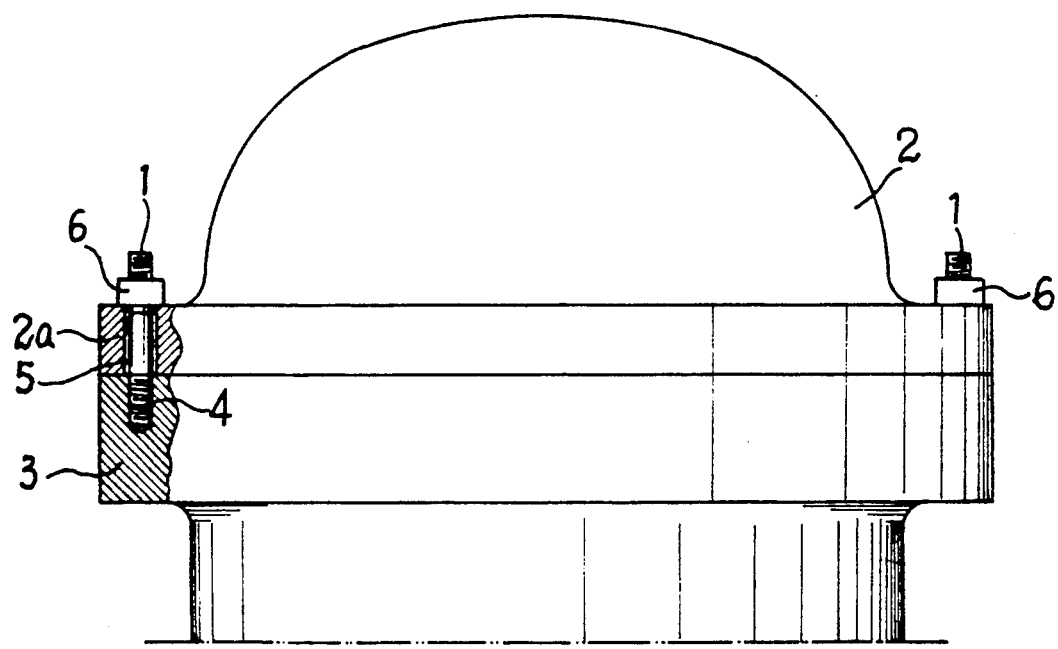
FIG. 1 is a schematic plan view of the cover of a vessel of a nuclear reactor.
Figure 2:
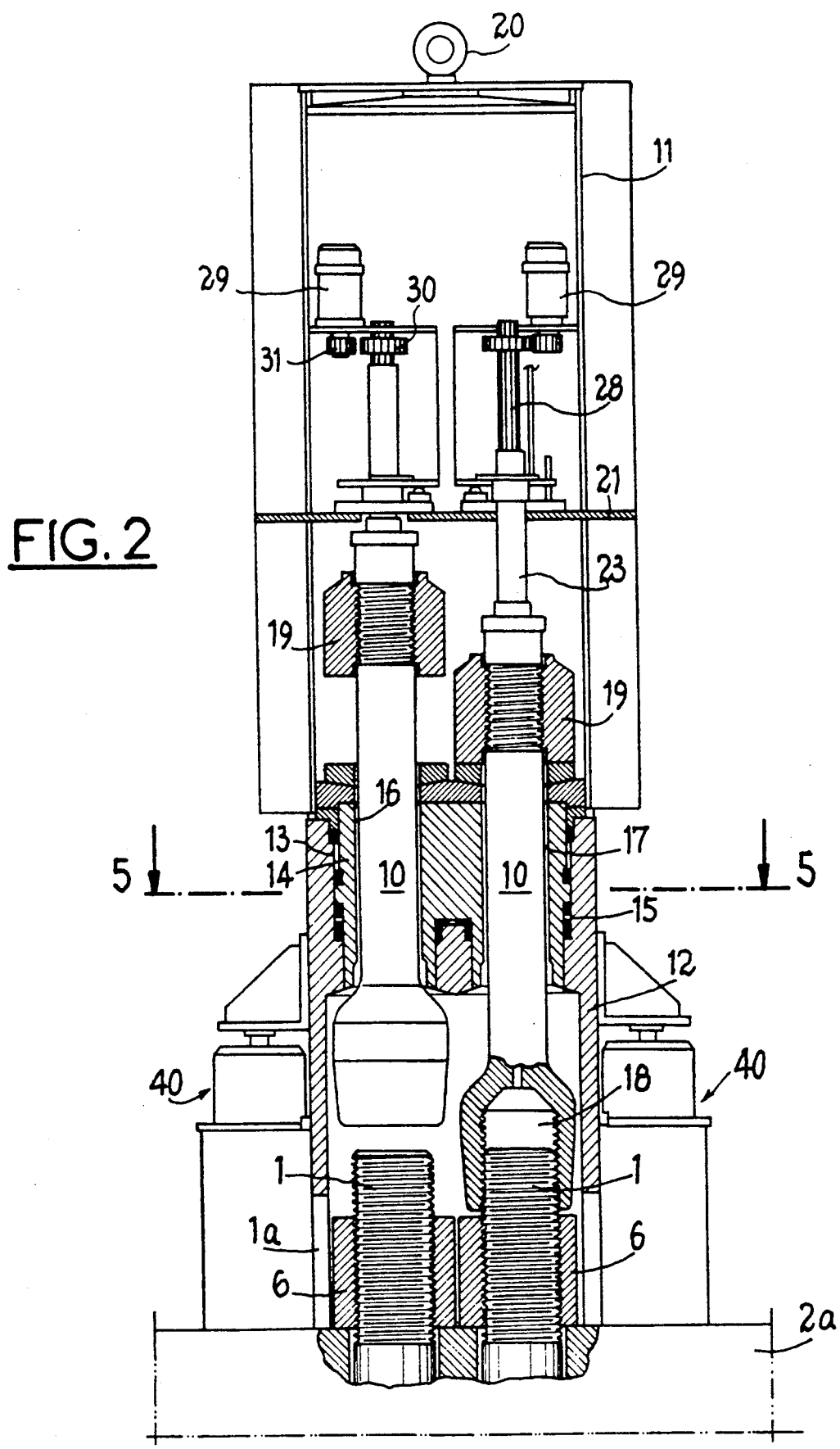
FIG. 2 is a schematic view in longitudinal section of the supporting and extending module provided with the device for optimum positioning according to the invention.

The supporting module, as illustrated in FIG. 2, is used for the simultaneous positioning and tensioning of two threaded connection elements 1 consisting, for example, of bolts and intended for fastening a cover 2 to a vessel 3, for example of a nuclear reactor (FIG. 1).

The upper part of vessel 3 is provided with of internally threaded holes 4 distributed symmetrically over a circumference concentric with the principal axis of the vessel and each intended for receiving the threaded end of a connection element 1.

The cover 2 also has a peripheral flange 2a pierced with open-ended bores 5 corresponding to the internally threaded holes 4 of the vessel 3 and distributed symmetrically over a circumference concentric with the principal axis of the cover. Each open-ended bore 5 is intended for the passage of the threaded connection element 1.

A clamping nut 6 is screwed onto the free end of each threaded connection element for the purpose of fastening the cover 2 to the vessel 3.

As the time of screwing or unscrewing of each clamping nut 6, it is necessary to exert a pull on each threaded connection element 1 by means of a suitable tensioning device.

Because the available length at the end of each connection element is not sufficient for screwing an extending nut and for positioning the tensioning device, it is essential to screw an extension piece onto such end.

For this purpose, the module illustrated in FIG. 2 comprises means for supporting two extension pieces 10 and for driving them in rotation, and means for the simultaneous tensioning of two threaded connection elements 1 by means of these extension pieces 10.

FIG. 2 shows one extension piece in the high position and one extension piece in a position screwed onto the end of the corresponding threaded connection element 1.

The module illustrated in FIG. 2 consists of a frame 11 supporting a cylindrical body 12 whose its upper part is provided with a bore 13 in which a double piston 14 is mounted.

This double piston 14 forms with the bore 13 of the cylindrical body 12 a pressure chamber 15 connected to means (not shown) for supplying fluid under pressure, and has two orifices 16 and 17, each for the passage of an extension piece 10.

The lower end of each extension piece 10 is provided with a threaded orifice 18, the threading of which corresponds to the threading of the connection element 1.

Screwed onto the upper end of each extension piece 10 is an extending nut 19 which bears on the double piston 14 when the corresponding extension piece 10 is screwed in the manner shown in the right-hand part of FIG. 1.

The lower part of the cylindrical body 12 has apertures 1a for the screwing and unscrewing of the clamping nuts 6 by means of a suitable tool (not shown).

The upper part of frame 11 of the module is provided with a lifting eye 20 for attachment to a sling of a hoist (not shown).

Figure 3:
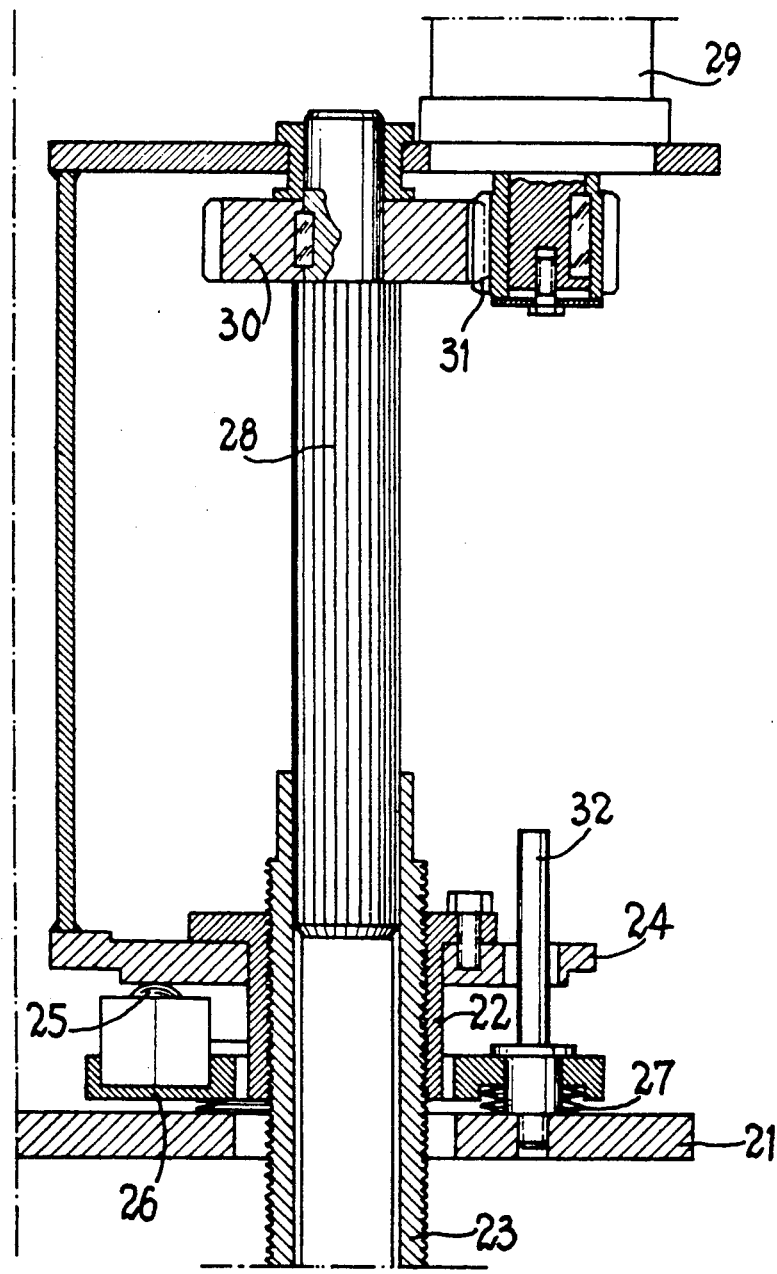
FIG. 3 is a sectional view on a larger scale of the means for driving the extension pieces in rotation.

Moreover, the middle part of frame 11 comprises a table 21 under which each extension piece 10 is suspended by means of an internally threaded bush 22, into which is screwed a tube 23 fixed to the corresponding extension piece 10 (FIG. 3).

The internally threaded bush 23 is screwed to a support 24.

The support 24 is placed on three balls 25 arranged at 120° on a plate 26 which is itself placed on three stacks of spring washers 27 interposed between the said plate 26 and the table 21, the washers being capable of supporting the weight of the extension piece 10.

The tube 23 is has inner splines making it possible to drive the extension piece 10 in rotation by means of a splined shaft 28 driven in rotation by a motor 29 by means of two pinions 30 and 31.

An anti-rotation rod 32 is interposed between the support 24 and the table 21, to prevent the support 24 from pivoting during the starting of the motor 29.

The means for driving each extension piece 10 in rotation are identical.

The module is also provided, according to the invention, with a device for the optimum positioning of the extension pieces 10 on the threaded connection elements 1.

This device comprises:

means for centering module on the threaded connection elements 1, means for supporting the module relative to the cover 2, and means for sliding the extension pieces 10 in a horizontal plane in relation to the axes of the threaded connection elements 1 at the time of screwing of these extension pieces.

Figures 5, 6:
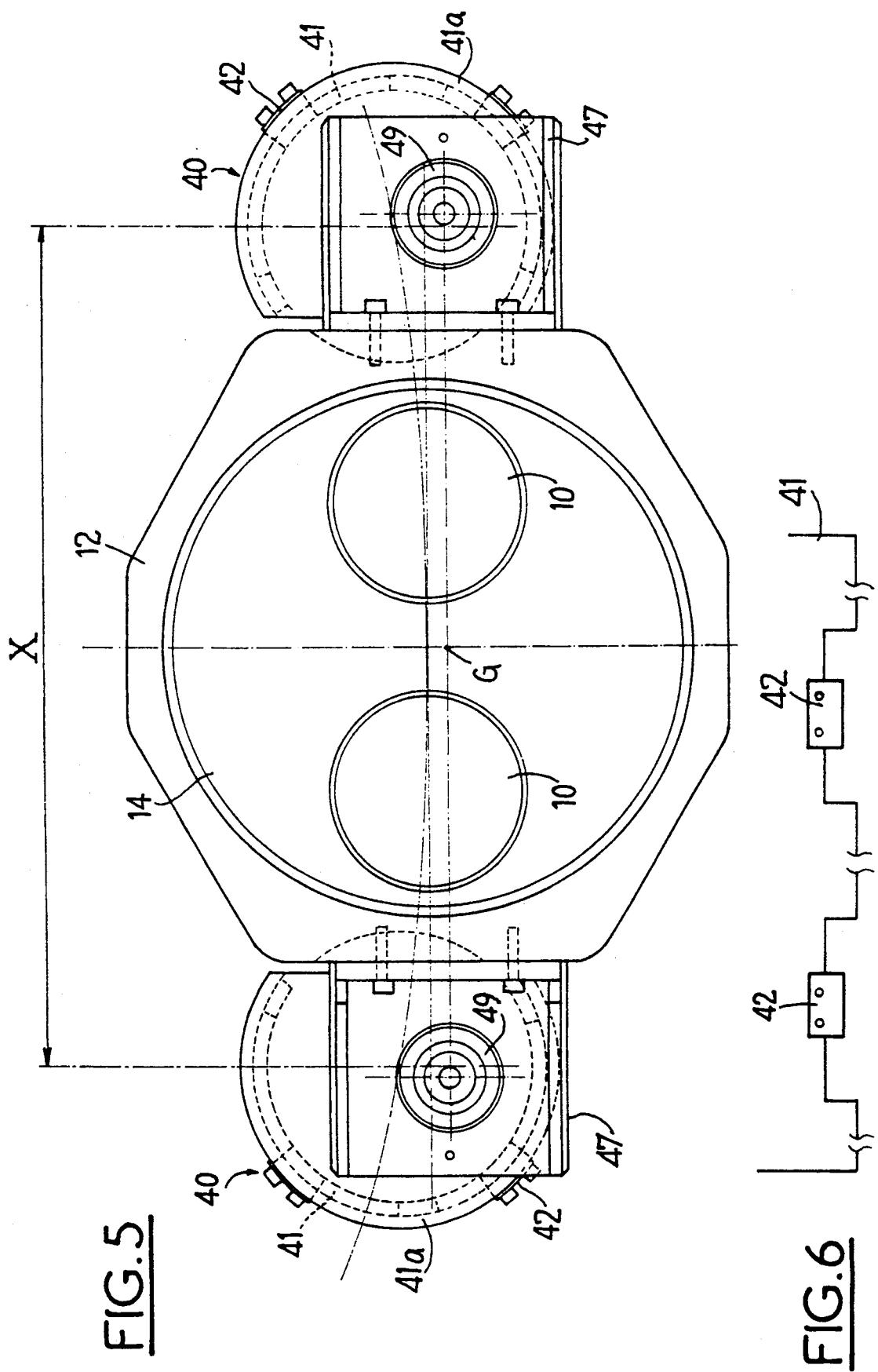
FIG. 5 is a sectional view along line 5—5 of FIG. 2.
FIG. 6 is a developed schematic view of the outer face of a bush of the device for optimum positioning according to the invention.

The centering means consist of two identical assemblies 40 inserted on each side and on the periphery of the cylindrical body 12 of the module (FIGS. 2 and 5).

Only one assembly will be described with reference to FIG. 4, the other assembly being identical.

Figure 4:
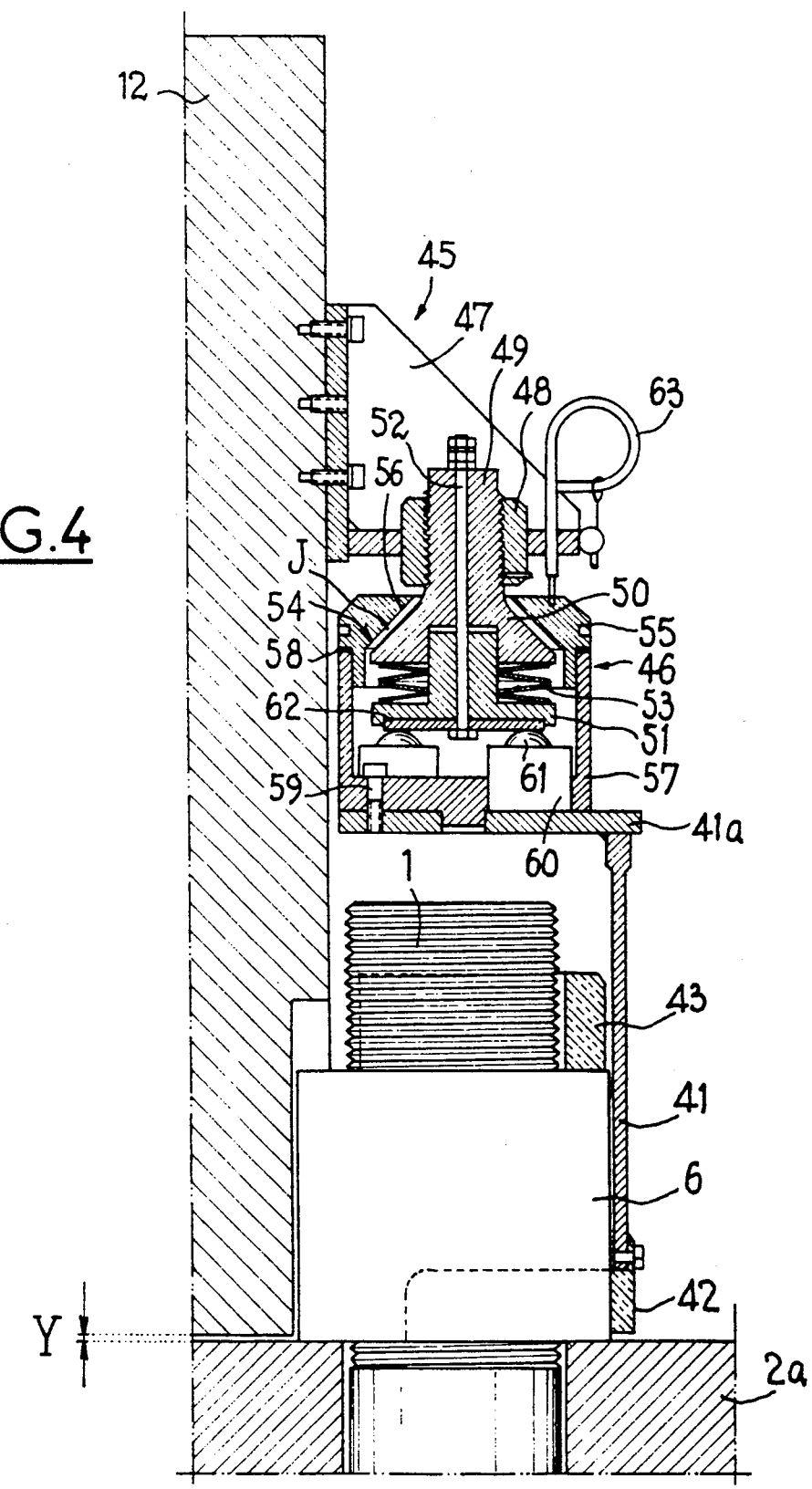
FIG. 4 is a sectional view on a larger scale of a device for optimum positioning according to the invention.

As shown in FIG. 4, the assembly 40 is composed of a bush 41 mounted on the side of the cylindrical body 12 of the module by means of fastening members.

The bush 41 bears on the flange 2a of the cover 2, at the same time capping the clamping nut 6 and the free end of the threaded connection element 1 adjacent to that on which the extension piece 10 is screwed.

For this purpose, the lower end of the bush 41 is provided with two guide elements 42 (FIG. 6).

A split ring 43, for example made of polyacetal, is placed on the clamping nut 6, in order to protect the nut and make it easier to center the bush 41 at the moment when the module is lowered.

The fastening members connecting the bush 41 to the cylindrical body 12 of the module are formed by a first part 45 fixed to the cylindrical body and a second part 46 fixed to the bush. The two parts 45 and 46 are displaceable relative to one another in a vertical plane and in a horizontal plane.

The first part 45 of the fastening members comprises a bracket 47 fastened to the cylindrical body 12 and provided with an internally threaded vertical tube 48, in which is screwed a vertical axle 49 having a male cone 50 in its lower part.

The vertical axle 49 is connected at its lower end with a slidably-mounted bolster 51 by means of a threaded rod 52.

The bolster 51 provides with the lower face of the vertical axle 49 a space in which the means for supporting the module are mounted.

These supporting means consist of at least one elastic member formed, for example, by a stack of spring washers 53. The threaded rod 52 also serves for adjusting the tension of the stack of spring washers 53.

The second part 46 of the fastening members comprises a female cone 54 intended for interacting with the male cone 50 of the first part 45 and formed in a cover 55 having a central orifice 56 for the passage of the vertical axle 49 of the first part.

The cover 55 is fastened to a housing 57.

At the time of assembly, the position of the cover 55 relative to the housing 57 is adjustable by means of shims 58, for example of the peel-off type, interposed between the said cover and the said housing, thus making it possible to have the capability of adjusting the play J between the two cones 50 and 54 when the bush 41 bears on the flange 2a of the cover 2.

The housing 57 is fastened to the upper plate 41a of the brush 41 by means of screws 59.

The means for sliding the module and consequently the extension pieces 10 in a horizontal plane consist of three ball cartridges 60 arranged at 120° relative to one another between the bottom of the housing 57 and the bolster 51.

The ball 61 of each ball cartridge 60 bears on the lower face of the bolster 51 at the time of screwing of the extension pieces 10. The lower face of the bolster 51 is equipped with an interchangeable wearing plate 62.

A removable pin 63 ensures that the bush 41 is aligned with the bracket 47.

As can be seen in FIG. 5, the axis of the bushes 41 is offset relative to the axis of the brackets 47, so as to be capable of matching the circumference over which the connection elements are distributed, particularly with regard to a vessel of a nuclear reactor.

Moreover, the supporting and sliding means as a whole are arranged in a single alignment passing through the center of gravity G of the module (FIG. 5).

The device operates in the following way.

The module is suspended from the hoist by means of its lifting eye 20, the extension pieces 10 being in the high position. Lowering takes place slowly until the bushes 41 engage on the rings 3 of the threaded connection elements 1 adjacent to those intended for receiving the extension pieces 10.

During the lowering phase, the spring washers 53 lay the cones 50 and 54 against one another, with the result that the assembly is temporarily rigid and the center distance of the bushes 41 corresponds to the center distance X (FIG. 5) of the outer threaded connection elements serving for the centering. Lowering continues until the bushes 41 come in contact with the flange 2a of the cover 2.

The sling of the hoist is slackened and the weight of the module is then supported by the two stacks of spring washers 53. The spring washers 53 are calculated so that the module thus put in place is at a height $Y = 2mm$ above the flange 2a of the cover 2.

In this position, the spring washers 53 are compressed, thus producing a play J of a few millimeters between the cones 50 and 54 and the balls 61 of the ball cartridges 60 are in contact with the wearing plate 62 of the bolster 51.

The module is thus placed on an elastic system, with the possibility both of vertical displacement by means of the spring washers 53 and all-round horizontal displacement of the value J simply by rolling on the balls 61.

When the extension pieces 10 descend while rotating so as to engage on the threaded connection elements 1 which are rigid, the floating system thus formed positions itself automatically relative to these two threaded connection elements, thereby eliminating any risk of an inability to be screwed or of seizure.

The module is therefore lowered onto the threaded connection elements without any special precaution, thus providing an appreciable time-saving, especially as regards work carried out in an irradiated environment.

If a lateral shock occurs during the lowering of the module, the systems can be disengaged at the level of conical assemblies and returned to the correct position without any damage.

Since the assembly consisting of the cylindrical block of the module and of the extension pieces is completely floating in the horizontal plane, the extension pieces are screwed freely, without generating any flanging which can prevent screwing as result in a seizure.

Furthermore, the tensioning of the extension pieces does not generate any bending stresses in the double piston or in the threaded connection elements, because all the components are realigned with one another, without the exertion of force, when the cylindrical block comes in contact with the component to be fastened.

I claim:

1. Device for optimum positioning of at least one extension piece (10) on at least one threaded connection element (1) for fastening a component (2) to an appliance (3), said extension piece (10) being intended to be screwed onto one threaded connection element (1), said device comprising a module (11, 12) for supporting said extension piece and comprising means (28 to 31) for driving said extension piece in rotation for screwing onto or unscrewing from a corresponding threaded connection element (1), and means (14,15) for tensioning said threaded connection element by means of said corresponding extension piece, said device further comprising:
   (a) means (40) for centering said module on said threaded connection element (1);
   (b) means (53) for supporting said module relative to said component (2); and
   (c) mans (60, 61) for sliding said extension piece in a horizontal plane relative to an axis of said corresponding threaded connection element (1) at the time of screwing of said extension piece.

2. Device according to claim 1, wherein said centering means (40) are formed by two bushes (41) mounted on each side of said module by means of fastening members (45, 46), each of said bushes interacting with a free end of said threaded connection element (1) adjacent to the threaded connection element receiving said extension piece (10).

3. Device according to claim 2, wherein said members for fastening each bush (41) to said module (11, 12) include a fist part (45) fixed to said module (11, 12) and a second part (46) fixed to said corresponding bush (41), said first and second parts (45, 46) being displaceable relative to one another in a vertical plane and in a horizontal plane.

4. Device according to claim 3, wherein said means (60, 61) for sliding said extension piece in a horizontal plane relative to said axis of said corresponding threaded connection element (1) are interposed between said first part (45) and said second part (46).

5. Device according to claim 3, wherein said first part (45) of each fastening member comprises a vertical axle (49) connected to said module (11, 12) by means of a bracket (47) and having a lower part in the shape of a male cone (50).

6. Device according to claim 5, wherein a lower part of said vertical axle (49) is connected with a bolster (51) mounted slidably in said axle and forming with a lower face of said axle a space in which said means (53) for supporting said module (11, 12) are mounted.

7. Device according to claim 1, wherein said means (53) for supporting said module consist of at least one elastic member.

8. Device according to claim 7, wherein said elastic member is formed by a stack of spring washers (53).

9. Device according to claim 6, wherein said second part (46) of each fastening member comprises a female cone (54) interacting with said male cone (50) of aid first part (45) and formed in a cover (55) having a central orifice (56) for passage of said vertical axle (49) of said first part (45) said cover (55) being mounted on an upper end of a housing (57) fastened to a corresponding bush (41).

10. Device according to claim 21, wherein said female cone (54) with said corresponding male cone (50) provides a play when said bush (41) bears on said component (2) to be fastened, said play being adjustable by means of shims (58) interposed between said cover (55) and said housing (57).

11. Device according to claim 8, wherein said means for sliding said extension piece (10) in a horizontal plane consist of at least two ball cartridges (60) arranged between a bottom of said housing (57) and said bolster (51) of said first part (45) of said corresponding fastening member, a ball (61) of each ball cartridge (60) bearing on a lower face of said bolster (51) at the time of screwing of said extension piece.

12. Device according to claim 11, wherein said lower face of said bolster (51) is provided with an interchangeable wearing plate (62).

* * * * *